(12) United States Patent
Bennett

(10) Patent No.: US 12,141,424 B1
(45) Date of Patent: Nov. 12, 2024

(54) SYSTEM AND METHOD FOR IMAGE CREATION AND DISPLAY

(71) Applicant: Robert Bennett, Brooklyn, NY (US)

(72) Inventor: Robert Bennett, Brooklyn, NY (US)

(*) Notice: Subject to any disclaimer, the term of this patent is extended or adjusted under 35 U.S.C. 154(b) by 0 days.

(21) Appl. No.: 18/623,549

(22) Filed: Apr. 1, 2024

(51) Int. Cl.
*G06F 3/04845* (2022.01)
*G06T 11/60* (2006.01)

(52) U.S. Cl.
CPC .......... *G06F 3/04845* (2013.01); *G06T 11/60* (2013.01)

(58) Field of Classification Search
None
See application file for complete search history.

(56) References Cited

U.S. PATENT DOCUMENTS

| | | | | |
|---|---|---|---|---|
| 8,212,821 B1 * | 7/2012 | Kopylov | ............. | G06T 13/80 345/473 |
| 10,079,854 B1 * | 9/2018 | Scott | ............. | H04L 67/02 |
| 10,956,497 B1 * | 3/2021 | Plymale | ............. | G06F 16/56 |
| 2009/0237405 A1 * | 9/2009 | Hayashi | ............. | G06T 11/60 345/440 |
| 2015/0339731 A1 * | 11/2015 | Bloem | ............. | G06Q 30/0276 705/14.72 |
| 2016/0259630 A1 * | 9/2016 | Roos | ............. | G06Q 10/101 |
| 2019/0244693 A1 * | 8/2019 | Haws | ............. | A61B 5/7435 |
| 2021/0150082 A1 * | 5/2021 | Auh | ............. | G05B 19/41805 |
| 2021/0388979 A1 * | 12/2021 | Maderic | ............. | F21V 33/0008 |
| 2023/0131916 A1 * | 4/2023 | Elbaz | ............. | G06F 16/54 715/809 |
| 2024/0086159 A1 * | 3/2024 | Kol | ............. | G06F 40/197 |

OTHER PUBLICATIONS

"Collagen—The Collage Generator"; available at least as early as Apr. 1, 2024; 9 pages.

* cited by examiner

Primary Examiner — David H Chu
(74) Attorney, Agent, or Firm — Fitch, Even, Tabin & Flannery LLP

(57) ABSTRACT

A graphical user interface renders a display on a display screen that include a preview image described by contents of an input file. When the user is satisfied with the preview image, the input file is automatically converted into a single output scalable vector graphic (SVG) compliant file. Various actions can be performed with the single output SVG compliant file.

16 Claims, 17 Drawing Sheets

```
{
    "vars": {
        "width": 100,
        "height": "(width)",
        "n-spokes": 36,
        "cx": "{(/width 2)}",
        "cy": "{(/height 2)}",
        "spokes-length": "{(= width 0.75)}"
    },
    "attrs": {
        "viewBox": "x y (width) (height)"
    },
    "children": [
        {
            "for_each": {
                "variable": "1",
                "in": { "start", x, "end", "(n-spokes)" }
            },
            "do": {
                "tag": "Line",
                "vars": {
                    "theta": "{(= (/ 1 n-spokes) (p1))}",
                    "dx": "{(= (/ spoke-lentgh 2) (cos theta))}",
                    "dy": "{(= (/ spoke-lentgh 2) (sin theta))}"
                },
                "attrs": {
                    "x1": "{(+ cx dx)}",
                    "x2": "{(- cx dx)}",
                    "y1": "{(+ cy dy)}",
                    "y2": "{(- cy dy)}",
                    "strake": "tag1{((" (/ 1 n-spokes) 360)), 100%, 50%}"
                }
            }
        }
    ]
}
```

```
{
    "vars": {
        "tile_width": 50,
        "tile_height": 50,
        "n_tiles_wide": 8,
        "n_tiles_tall": 5,
        "total_width": "{(* tile_width n_tiles_wide)}",
        "total_height": "{(* tile_height n_tiles_tall)}"
    },
    "attrs": {
        "viewBox": "0 0 {total_width} {total_height}"
    },
    "children": [
        {
            "tag": "defs",
            "children": [
                {
                    "tag": "symbol",
                    "attrs": {
                        "id": "tile",
                        "viewBox": "0 0 {total_width} {total_height}"
                    },
                    "children": [
                        {
                            "image_path": "stone.webp",
                            "attrs": {
                                "width": "{tile_width}",
                                "height": "{tile_height}"
                            }
                        }
                    ]
                }
            ]
        },
        {
            "for_each": {
                "variable": "i",
                "in": { "start": 0, "end": "{n_tiles_wide}" }
            },
            "do": {
                "for_each": {
                    "variable": "j",
                    "in": { "start": 0, "end": "{n_tiles_tall}" }
                },
                "do": {
                    "tag": "use",
                    "attrs": {
                        "href": "#tile",
                        "x": "{(* i tile_width)}",
                        "y": "{(* j tile_height)}"
                    }
                }
            }
        }
    ]
}
```

FIG. 6

```
<svg xmlns="http://www.w3.org/2000/svg" viewBox="0 0 400 250">
    <defs>
        <symbol id="tile" viewBox="0 0 400 250">
            <image width="50" height="50"
                href="data:image/webp;base64,Ukl <... truncated ...> AAAA"></image>
        </symbol>
    </defs>
    <use href="#tile" x="0" y="0"></use>
    <use href="#tile" x="0" y="50"></use>
    <use href="#tile" x="0" y="100"></use>
    <use href="#tile" x="0" y="150"></use>
    <use href="#tile" x="0" y="200"></use>
    <use href="#tile" x="50" y="0"></use>
    <use href="#tile" x="50" y="50"></use>
    <use href="#tile" x="50" y="100"></use>
    <use href="#tile" x="50" y="150"></use>
    <use href="#tile" x="50" y="200"></use>
    <use href="#tile" x="100" y="0"></use>
    <use href="#tile" x="100" y="50"></use>
    <use href="#tile" x="100" y="100"></use>
    <use href="#tile" x="100" y="150"></use>
    <use href="#tile" x="100" y="200"></use>
    <use href="#tile" x="150" y="0"></use>
    <use href="#tile" x="150" y="50"></use>
    <use href="#tile" x="150" y="100"></use>
    <use href="#tile" x="150" y="150"></use>
    <use href="#tile" x="150" y="200"></use>
    <use href="#tile" x="200" y="0"></use>
    <use href="#tile" x="200" y="50"></use>
    <use href="#tile" x="200" y="100"></use>
    <use href="#tile" x="200" y="150"></use>
    <use href="#tile" x="200" y="200"></use>
    <use href="#tile" x="250" y="0"></use>
    <use href="#tile" x="250" y="50"></use>
    <use href="#tile" x="250" y="100"></use>
    <use href="#tile" x="250" y="150"></use>
    <use href="#tile" x="250" y="200"></use>
    <use href="#tile" x="300" y="0"></use>
    <use href="#tile" x="300" y="50"></use>
    <use href="#tile" x="300" y="100"></use>
    <use href="#tile" x="300" y="150"></use>
    <use href="#tile" x="300" y="200"></use>
    <use href="#tile" x="350" y="0"></use>
    <use href="#tile" x="350" y="50"></use>
    <use href="#tile" x="350" y="100"></use>
    <use href="#tile" x="350" y="150"></use>
    <use href="#tile" x="350" y="200"></use>
</svg>
```

FIG. 7

SYSTEM AND METHOD FOR IMAGE CREATION AND DISPLAY

FIELD OF INVENTION

The field of invention relates to the creation and usage of electronic images and the files that are utilized to create these images.

BACKGROUND

Electronic images are used in various applications. For example, electronic images are used in electronic documents, web sites, or in emails.

Different image types and formats are utilized in these applications. For example, the JPEG and PNG formats, to mention two examples, are utilized. The different image formats are typically optimized for different types of image data, and sometimes suffer when made to store image data they are not optimized for. For instance, the JPEG image type is optimized for images with smoothly varying gradients (e.g., photographs taken by a camera). As such, JPEG images sometimes include compression artifacts when made to store geometric shapes or text. On the other hand, the PNG image type is optimized for images with long runs of few distinct colors but requires a large file size when used to store images with many distinct colors (e.g., photographs).

JPEGs and PNGs are both raster formats, and correspond to a rectangular grid of pixels. A given raster image has a fixed resolution (e.g., pixels per inch), which is, roughly speaking, the amount of detail present in the image, as well as a fixed width and height. When a raster image is sufficiently zoomed, the individual pixels that comprise the image are visible. On the other hand, vector graphics store geometric objects such as lines, rectangles, ellipses, and even text, which have no resolution. The image can be zoomed infinitely far and the zoomed image will always maintain a smooth, pixel-perfect appearance.

The creation and editing of images can be difficult. Much of the difficulty is due to the lack of programmatic facilities offered by image editing programs. For example, while some image editing programs support "guides" or "snapping" to allow graphical elements to be positioned relative to each other, there is no electronic or programmatic "glue" to hold the elements together indefinitely. Moving one element tends not to move the other element in tandem. Creating several similar elements by hand is also difficult as is synchronizing these different elements.

BRIEF DESCRIPTION OF THE DRAWINGS

Various needs are at least partially met through provision of approaches that create images when studied in conjunction with the drawings. A full and enabling disclosure of the aspects of the present description, including the best mode thereof, directed to one of ordinary skill in the art, is set forth in the specification, which refers to the appended figures, in which:

FIG. 6 comprises a JSON file that represents an input or manifest file according to various embodiments of the present invention;

FIG. 7 comprises an SVG-compliant file according to various embodiments of the present invention;

DETAILED DESCRIPTION

Figure 1:
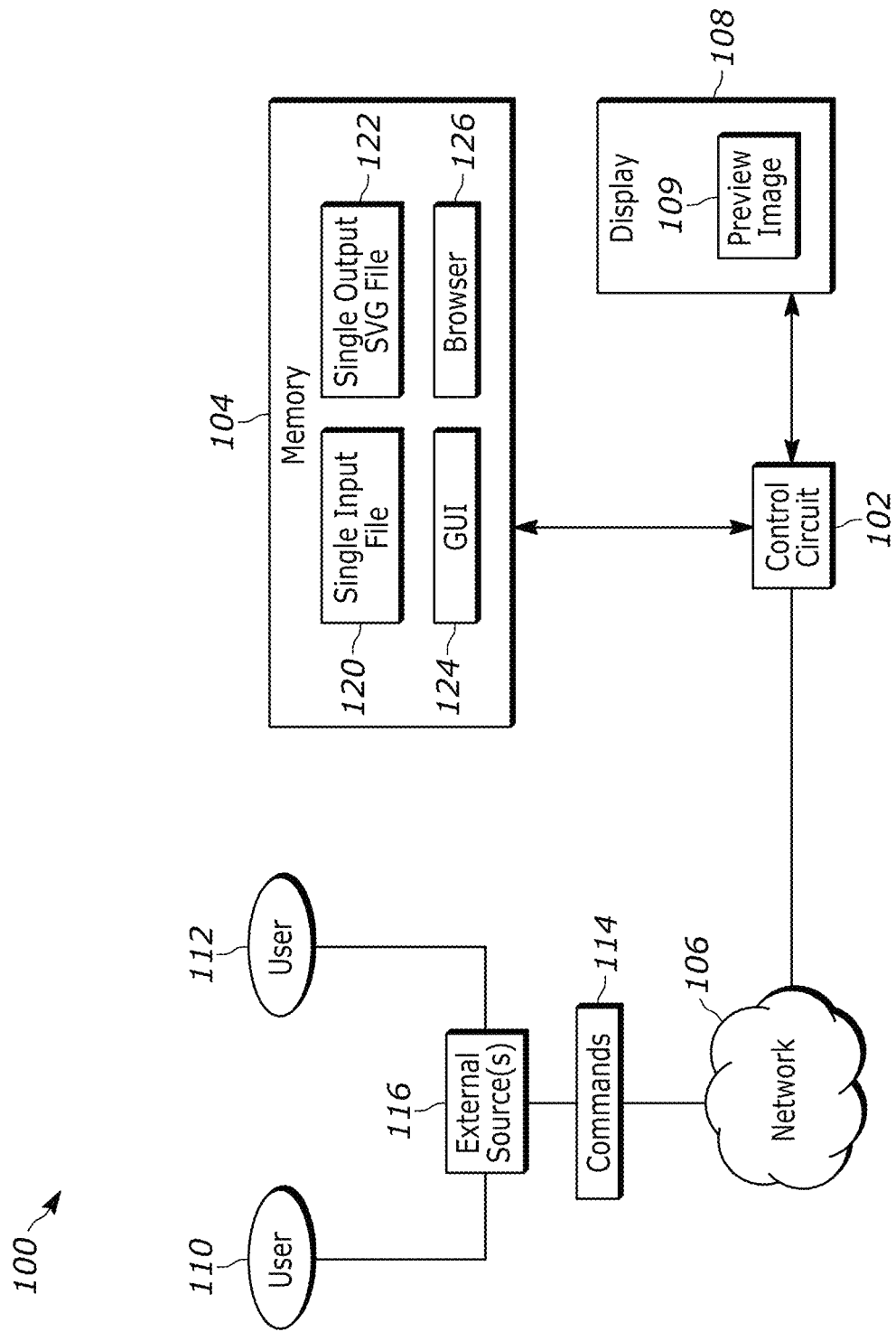
FIG. 1 comprises a block diagram of a system according to various embodiments of the present invention.

The approaches provided herein allow a user to automatically and easily create SVG-compliant files that include both vector graphics and images. In aspects, the approaches provided herein allow a user to write a specification of an output SVG image in a simple plain-text file in JSON format (sometimes referred to herein as a manifest or input file).

In aspects, a textual description (e.g., in JSON format) of an image is automatically, easily, and seamlessly converted into an SVG-compliant file. Other input serialization formats, such as TOML and YAML, are also possible.

In other aspects, these approaches enable the user to name custom functions so that they can reuse these functions. More informative/instructive error messages are also provided by the present approaches than provided by previous approaches. More extensibility is additionally provided, for example, allowing users to add custom tag types, support bindings from other languages, and generally make any image creation or editing project easier to use from other programs instead of restricting users to running the executable program as-is.

In still other aspects, a graphical user interface (GUI) for working with the text format is provided. The use of a textual format for describing images has several benefits in addition to merely being easy to write, which including the ability to store any constituent images losslessly and non-destructively, avoiding the needless rasterization of text and other vector shapes, and exposing programmatic facilities such as for-loops and if-else blocks to the author of the image. These benefits would remain if a GUI were built that stored its data using the textual format were devised. In aspects, the GUI would provide an interface to even more easily create and edit images specified through the textual format. It would store its images in the aforementioned textual format and thus have the benefits described above.

Using previous approaches, to add some text on top of a JPEG image, the text would have to be rasterized thereby converting the infinitely smooth shapes to a grid of pixels and losing the precision inherent in vector graphics. The approaches described herein allow JPEGs, PNGs, and any other images supported by browsers to coexist with each other and with vector graphic elements in an SVG-compliant file, leading to neither the loss in quality nor the increase in file size that arise when using the wrong image format. The present approaches achieve this by, in one specific example, base64-encoding the source images and embedding the encoded image directly into the SVG-compliant file.

Creating several similar elements by hand can be difficult and keeping them in synchronization is also difficult. The present approaches provide for each tag to programmatically create arbitrary numbers of elements, and the children elements can make use of the loop variable to control their behavior. To take one example, an image of a pin wheel with various spokes emanating from a center may be created. The image of a pin wheel can use a loop variable i to set the angle and color of each spoke of the wheel. The "for loop" itself had access to the "n-spokes" variable set at the beginning of the file.

In many of these embodiments, a system includes a computer memory and a control circuit. The computer memory configured to store an input file, a graphical user interface, and a browser. The control circuit is coupled to the computer memory and is configured to operate and control the graphical user interface and execute the browser.

The graphical user interface is configured to render a display on a display screen. The display comprises a first area that includes a preview image described by contents of the input file as rendered by the control circuit. The preview image rendered in the first area of the display is automatically and responsively changed in real time by the control circuit as the contents of the input file are changed.

A user adjusts the contents of the input file via interactions with the browser until a user is satisfied with the preview image. When the user is satisfied with the preview image, the input file is automatically and without human interaction converted by the control circuit into a single output scalable vector graphic (SVG) compliant file and stored in the computer memory and wherein the SVG compliant file includes both vector graphics and images. The control circuit determines an action to take with the single output SVG compliant file. The action is one or more of: displaying contents of the single output SVG compliant file on the display screen; transmitting the single output SVG compliant file to an electronic device of another user for display; reading the contents of the single output file, determining command tags of portions of the single output SVG compliant file, downloading the file for sharing and/or viewing; and selectively displaying the portions on the display screen based upon the command tags; and utilizing the single output SVG compliant file to create electronic control signals that are effective to selectively control a machine. Other examples of actions are possible.

In aspects, the control circuit is coupled to an electronic network and the control circuit monitors the electronic network for commands or messages sent by external computer programs intended to modify the input file, and, when received, analyzes the commands or messages, and automatically changes contents of the input file according to contents of the commands or messages, allowing collaboration between multiple users utilizing multiple computer programs to occur.

In other examples, the input file is configured in JSON format. Other formats are possible.

In yet other examples, the display screen is located on a smartphone, laptop, or personal computer. Other examples are possible.

In still other examples, the machine is one or more of an industrial machine, a computer, or a user electronic device. Other examples are possible.

In yet other aspects, utilizing the single output SVG compliant file to create electronic control signals comprises applying the single output SVG compliant file to electronic circuitry or a neural network to produce the electronic control signals.

In others of these embodiments, an input file, a graphical user interface, and a browser in a computer memory are stored. A control circuit is provided, the control circuit being configured to operate and control the graphical user interface and execute the browser.

The graphical user interface is configured to render a display on a display screen, the display comprising a first area that includes a preview image described by contents of the input file as rendered by the control circuit. The preview image rendered in the first area of the display is automatically and responsively changed in real time by the control circuit as the contents of the input file are changed.

The contents of the input file are adjusted via interactions with the browser until a user is satisfied with the preview image. When the user is satisfied with the preview image, the control circuit automatically and without human interaction converts the input file into a single output scalable vector graphic (SVG) compliant file and storing the single output SVG compliant in the computer memory and wherein the SVG compliant file includes both vector graphics and images.

The control circuit, determines an action to take with the single output SVG compliant file, the action being one or more of: displaying contents of the single output SVG compliant file on the display screen; transmitting the single output SVG compliant file to an electronic device of another user for display; reading the contents of the single output SVG compliant file, determining command tags of portions of the single output file, selectively displaying the portions on the display screen based upon the command tags; and utilizing the single output SVG compliant file to create electronic control signals that are effective to selectively control a machine. Other examples of actions are possible.

In further aspects, the control circuit is coupled to an electronic network and the control circuit monitors the electronic network for commands or messages sent by external computer programs intended to modify the input file, and, when received, analyzes the commands or messages, and automatically changes contents of the input file according to contents of the commands or messages, allowing collaboration between multiple users utilizing multiple computer programs to occur.

Referring now to FIG. 1, one example of a system 100 for automatically taking an input file (in textual format) and producing an SVG-compliant file (with any external assets embedded in the SVG file) is described. The system 100 includes a control circuit 102, an electronic memory 104, a network 106, and a display 108.

The control circuit 102 is any type of electronic processing device or processor such as a microprocessor that executes programmed computer instruction. The control circuit 102 may have a separate electronic memory that stores these instructions.

The electronic memory 104 is any type of electronic memory such as a random access memory (RAM), read only memory (ROM), electronically erasable programmable read only memory (EEPROM), any combination of these devices, or any other type of electronic memory device or combination. The electronic memory 104 stores a single input file 120, a single output SVG file 122, a graphical user interface (GUI) 124, and a browser 126.

The single input file 120 is a single electronic object that is plain text file (and is also referred to as a "manifest file" herein). In one example, the single input file 120 conforms to the JSON format. Other formats are possible. Plain text, in aspects, refers to file contents where the file contents represent only characters of readable material but not its graphical representation nor other objects (floating-point numbers, images, etc.). It may also include a limited number of "whitespace" characters that affect simple arrangement of text, such as spaces, line breaks, or tabulation characters. It will be appreciated that plain text is different from formatted text, where style information is included. Plain text is also different from structured text, where structural parts of the document such as paragraphs, sections, and the like are identified. Plain text is also different from binary files in which some portions must be interpreted as binary objects (encoded integers, real numbers, images, etc.).

The usage of plain text in the input file 120 of the present approaches is advantageous because using plain text provides independence from programs that require their very own special encoding or formatting or file format. Plain text files can be opened, read, and edited with ubiquitous text editors and utilities. Plain text is easy to edit without a complicated image editing program.

One example of the usage of plain text is usage within computer programming languages. Programming language source files, which are plain text, give the programmer a precise way to easily dictate to a computer, or a program running on that computer, how it should operate.

The single output SVG-compliant file 122 includes vector graphics and images. The SVG-compliant file 122 can store vector graphics and the different kinds of raster images. The SVG compliant file 122 provides various advantages in the present approaches. For example, the SVG-compliant file 122 is widely compatible and can be used with multiple types of browsers. In other aspects, the SVG-compliant file 122 includes a tree of nodes with some attributes making the file simple to implement. In still other aspects, the SVG-compliant file 122 is written in the XML format, which is plain text The SVG images included with the SVG-compliant file 122 are defined in a vector graphics format and stored in XML text files. SVG images can thus be scaled in size without loss of quality, and the SVG-compliant file 122 can be searched, indexed, scripted, and compressed. When the SVG-compliant file 122 is implemented as an XML text file, this XML text file can be created and edited with text editors or vector graphics editors, and are rendered by the most-used web browsers.

In addition to the above-mentioned capabilities, the SVG-compliant file 122 supports combining shapes, text, and images into a single file while avoiding the unnecessary rasterization of these elements. As mentioned, the SVG-compliant file 122 in some aspects is implemented as a plain text file.

By "SVG-compliant," it is meant that the file complies completely, closely, operationally, and/or substantially with the SVG protocol or format (e.g., the Scalable Vector Graphics (SVG) Protocol 1.1, Second Edition 16 Aug. 2011). In other words, "SVG-compliant" files as described herein adhere completely or generally to the rules and guidelines of the SVG protocol. Thus, files that have a format and/or contents that represent minor changes from the SVG format so as to not follow the SVG format completely but that do not amount to a substantial format change and/or cause a substantial change as to how these files are processed, analyzed, interpreted, and/or used are considered to be "SVG-compliant" as that term is used herein.

The graphical user interface (GUI) 124 may allow humans to interact with different parts, elements or components of the system. The GUI 124 may include or be supported by electronic hardware and software that facilitate these interactions with such elements as buttons, screens, displays, mouses, keyboards, cursors, menus, icons, and so forth.

The browser 126 may be a computer program that allows a user to interact with information on the internet, other networks, or various types of computer systems. Examples of computer browsers include Chrome, Safari, and Firefox. Other examples of browsers are possible.

The network 106 is any type of electronic communication network or combination of networks. For example, the network 106 may be the internet, a cloud network, a cellular network, a wireless network, a local area network, a wide area network, or combinations of these and other networks.

The display 108 is any type of electronic display that displays text, images, files, web sites, or any other visible object or objects. The display 108 renders a preview image 109 in a preview image area. The preview image area is conveniently located on the screen and is of suitable size and position so as to be readily viewable to a user. The display 108 may be incorporated into any electronic device such as a personal computer, laptop, cellular phone, or smart phone to mention a few examples.

External sources 116 may relate to or be associated with a first user 110 and a second user 112 that may send commands 114 over the network 106. The control circuit 102 monitors for the commands 114. The commands 114 are used to alter the input file 120. The commands 114 may be instructions, communications, inquiries and/or other electronic communications from any of other external sources 116 (e.g., originate from the first user 110 and/or the second user 112). The external sources 116 may include other user electronic devices operated and/or controlled by the first user 110 and/or the second user 112 such as other personal computers, laptops, smart phones, or cellular phones to mention a few examples. Although only the first user 110 and the second user 112 are shown in this example, it will be appreciated that any number of users are possible. It will also be appreciated that while the users, in some cases, are human users, the users may also be machines, neural networks, or other automated electronic devices or artificial intelligence units, devices, programs, networks, or structures.

In one example of the operation of the system of FIG. 1, the control circuit 102 is configured to operate and control the graphical user interface 124 and execute the browser 126. The graphical user interface 124 is configured to render the display 108 on a display screen. The display 108 comprises a first area that includes the preview image 109 described by contents of the input file 120 as rendered by the control circuit 102. The preview image 109 rendered in the first area of the display 108 is automatically and responsively changed in real time by the control circuit 102 as the contents of the input file 120 are changed.

The contents of the input file 120 are adjusted via interactions with the browser 126 until the user is satisfied with the preview image 109. When the user is satisfied with the preview image 109, the control circuit 102 (after receiving an indication of acceptance by the user) automatically and without human interaction converts the input file 120 into the single output scalable vector graphic (SVG) compliant file 122 and stores the single output SVG compliant file 122 in the computer memory 104. The SVG compliant file 122 includes both vector graphics and/or shapes and images. By "vector graphics and/or shapes" it is meant that the image components are described geometrically as points, lines, and/or curves, which have infinite resolution and can be zoomed in indefinitely without any loss of quality (unlike raster images, which have a finite resolution as described above). Images may be included in the form of any image file such as a JPEG or PNG file.

The control circuit 102 determines an action to take with the single output SVG compliant file 122. The action can be one or more actions including displaying contents of the single output SVG compliant file 122 on the display 108; transmitting the single output SVG compliant file 122 to an electronic device of another user for display; reading the contents of the single output SVG compliant file 122, determining command tags of portions of the single SVG-compliant file 122, selectively displaying the portions on the display 108 based upon the command tags; and utilizing the single output SVG compliant file 122 to create electronic control signals that are effective to selectively control a machine (e.g., an electronic device, a display, or a manufacturing machine to mention a few examples). Other examples of actions are possible.

In further aspects, the control circuit 102 is coupled to the electronic network 106 and the control circuit 102 monitors the electronic network 106 for commands 114 (or messages) sent by external computer programs intended to modify the input file, and, when received, analyzes the commands or messages, and automatically changes contents of the input file 120 according to contents of the commands 114 (or messages), allowing collaboration between multiple users utilizing multiple computer programs to occur. In this way, users can collaborate in creating or constructing images.

Figure 2:
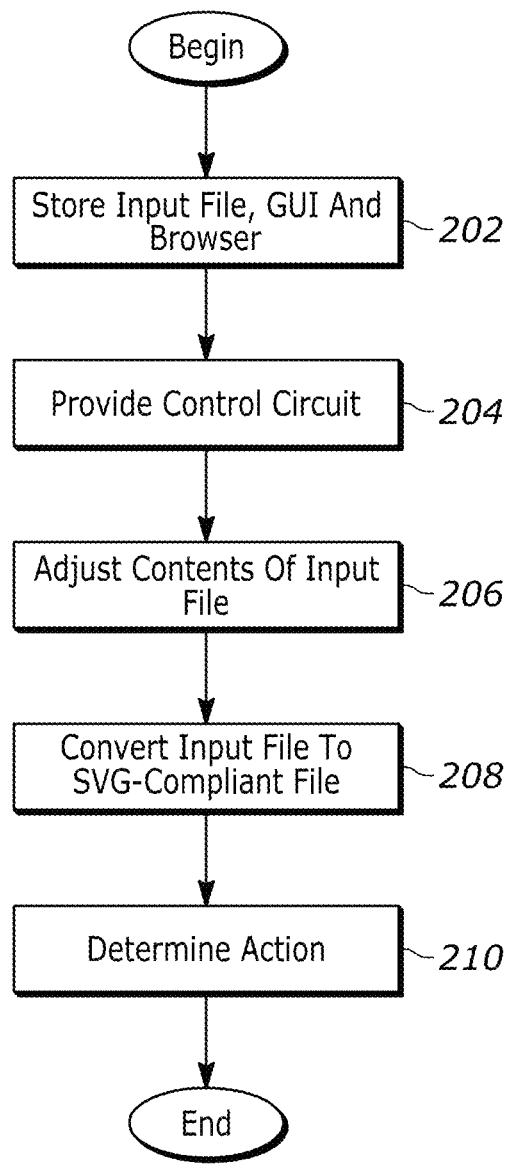
FIG. 2 comprises a flowchart according to various embodiments of the present invention.

Referring now to FIG. 2, one example of an approach that creates and displays images is described. At step 202, an input file, a graphical user interface (GUI), and a browser are stored in a computer memory. The GUI facilitates the editing and display of images. The input file is a text file that is easily editable by a user. The browser allows a user to interact with information on the internet, other networks, or various types of computer systems.

At step 204, a control circuit is provided. The control circuit is configured to operate and control the graphical user interface and execute the browser. The graphical user interface is configured to render a display on a display screen. The display comprises a first area that includes a preview image described by contents of the input file as rendered by the control circuit. The preview image rendered in the first area of the display is automatically and responsively changed in real time by the control circuit as the contents of the input file are changed.

At step 206, the contents of the input file are adjusted via interactions with the GUI and/or browser until a user is satisfied with the preview image. For example, the user may use a computer mouse to adjust the image file. In one specific example, the user uses the mouse to touch the image and by actions of the mouse, may cause the image to change size, shape, color, dimensions or other characteristics. These actions may be automatically translated and the contents of the input file altered. In other examples, the GUI and/or browser may be used to directly edit the input file.

At step 208 the control circuit automatically and without human interaction converts the input file into a single output scalable vector graphic (SVG) compliant file and stores the single output SVG compliant file in the computer memory. The SVG compliant file may include both vector graphics and images. "Vector graphics" may be or define shapes or geometric shapes (e.g., circles, squares, points, etc.), complex shapes (e.g., parametric curves), arbitrary curves, all other curves, polygons, and all forms of text (e.g., as rendered by a computer, in a given typeface or font, when the user types on the keyboard).

At step 210, the control circuit determines an action to take with the single output SVG compliant file. The action can be one or more displaying contents of the single output SVG compliant file on the display screen; transmitting the single output SVG compliant file to an electronic device of another user for display; reading the contents of the single output SVG compliant file, determining command tags of portions of the single output file, selectively displaying the portions on the display screen based upon the command tags; and utilizing the single output SVG compliant file to create electronic control signals that are effective to selectively control a machine. The machine may be a manufacturing machine or machines (used to create or produce products) or a robot (or robots) to mention two examples. The machine may be non-moveable and arranged in a fixed location (e.g., in a manufacturing plant) or moveable (e.g., a robot or automated vehicle) and moves through a store, factory, office, or warehouse to mention a few examples. In aspects, the operation of the machine and/or the machine's operating characteristics are controlled by the electronic control signals and this may involve controlling the speed of the machine, the type of product created by the machine, the activation of the machine (e.g., activation of a motor of the machine), the deactivation of the machine (e.g., deactivation of a motor of the machine), and movements of the machine and/or parts of the machine. In these regards, the machine may include arms, fingers, grippers, levers, drills, and/or other tools or components that are controlled, adjusted, and/or moved by the electronic control signals. Other examples of actions are possible.

Figure 3:
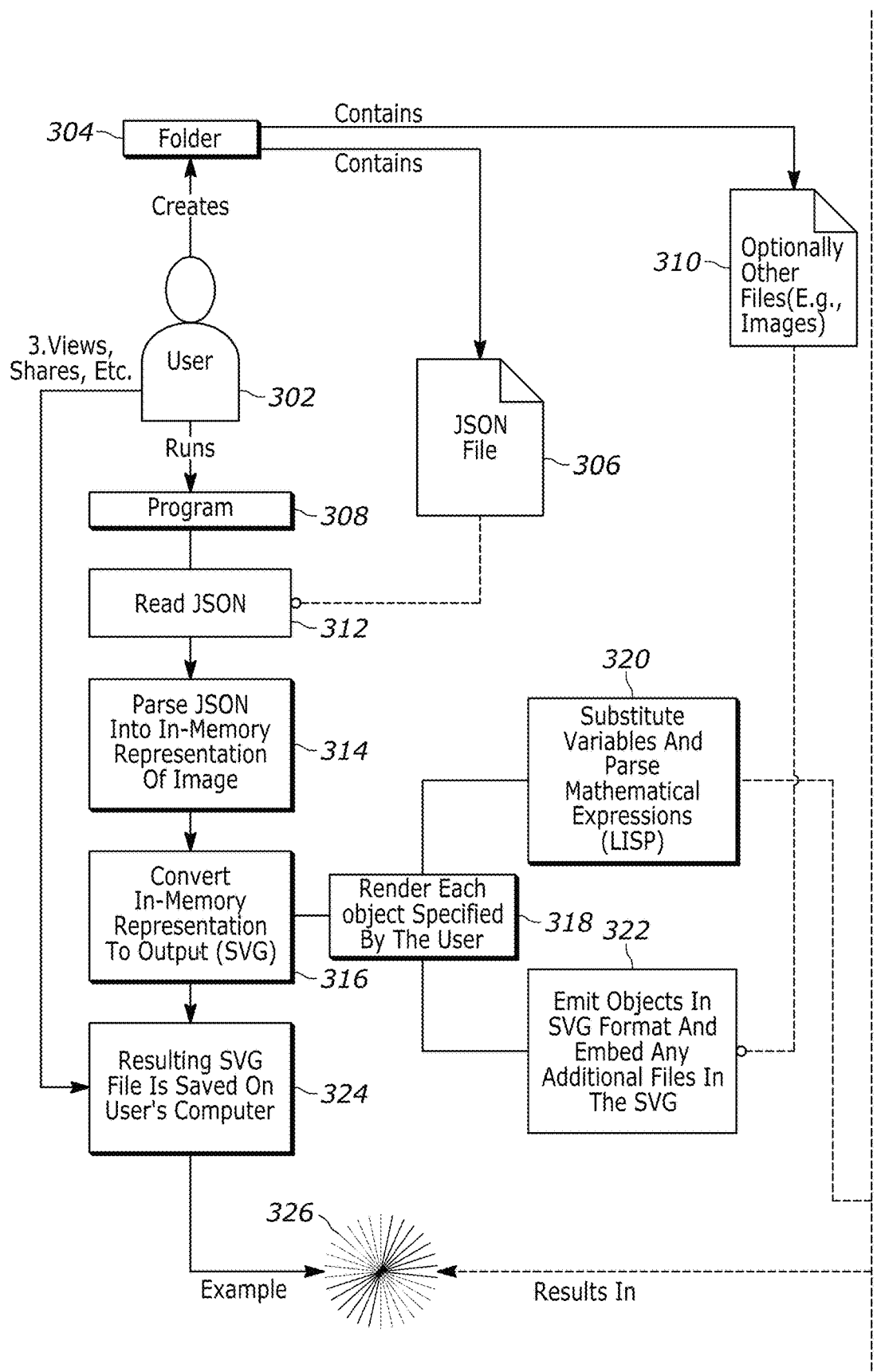
FIG. 3 comprises a diagram of a system and approach according to various embodiments of the present invention.

Referring now to FIG. 3, another example of a system that creates an SVG-compliant file from a text-based file is described. A user 302 creates an electronic folder 304. The electronic folder 304 is an electronic data structure that is configured to hold other electronic data structures or elements (e.g., files, programs, and so forth) and may be stored in an electronic memory in a user electronic device such as a personal computer, laptop, smart phone, or cellular phone to mention a few examples. In aspects, the electronic folder 304 includes or holds a JSON (or other text-based) file 306. The electronic folder 304 also may include images (or files that store or hold images). A computer program 308 (including computer executable instructions that may be implemented or executed at a control circuit) performs several steps including parsing the JSON file into objects, storing the objects of the JSON file in electronic memory, and/or converting the JSON file as stored in electronic memory into an SVG-compliant file. It will be appreciated that multiple programs, routines, subroutines, and processes can perform these functions. For example, a first program, routine, subroutine or process may perform the parsing and storage of the objects of the JSON file 306 in computer memory while a second program, routine, subroutine, or process may convert the objects as stored in the memory into the SVG-compliant file.

At step 312, the JSON file 306 (also referred to as a manifest or input file herein) is read. The JSON file 306 describes one or more images. The description of the one or more images, in aspects, is written in a programming language (e.g., LISP). That is, the image is described by programming language structures, codes, and/or instructions. The JSON file 306 may also utilize any image files in the electronic folder 304, for example, incorporating these images in the programming language structures, codes, and/or instructions.

At step 314, the JSON file 306 is parsed by the program 308 into an in-memory representation of an image. The in-memory representation may be objects represented in binary form to give one example. In aspects, the parsing utilizes or consults a schema to determine if elements or objects of the JSON file 306 follow the proper syntax and/or are of the correct type.

At step 316, the program 308 converts the in-memory representation of the image to an output file, e.g., an SVG-compliant file. The program 308 may utilize an algorithm, a program, a set of rules, and/or a mapping to perform the conversion. The result is the SVG-compliant file and the SVG-compliant file may describe (in SVG-compliant instructions in the file) one or more of the in-memory objects that themselves describe the image.

The conversion process includes, as shown in step 318, renders each object specified by the user into the SVG-compliant file. Step 318 includes further sub-steps, including, at step 320, substituting variables and parsing mathematical expressions and step 322, where objects in SVG format are emitted and any additional files (e.g., image files) are embedded in the SVG-compliant file.

At step 324, the resultant SVG-compliant file is saved on the computer of the user 302 and produces an image 326. Various actions can be taken with the SVG-compliant file as have been described elsewhere herein. For example, the SVG-compliant file may be used with other processes, shared among other users, displayed on various types of electronic devices, or used to control machines and/or processes to mention a few examples.

Figure 4:
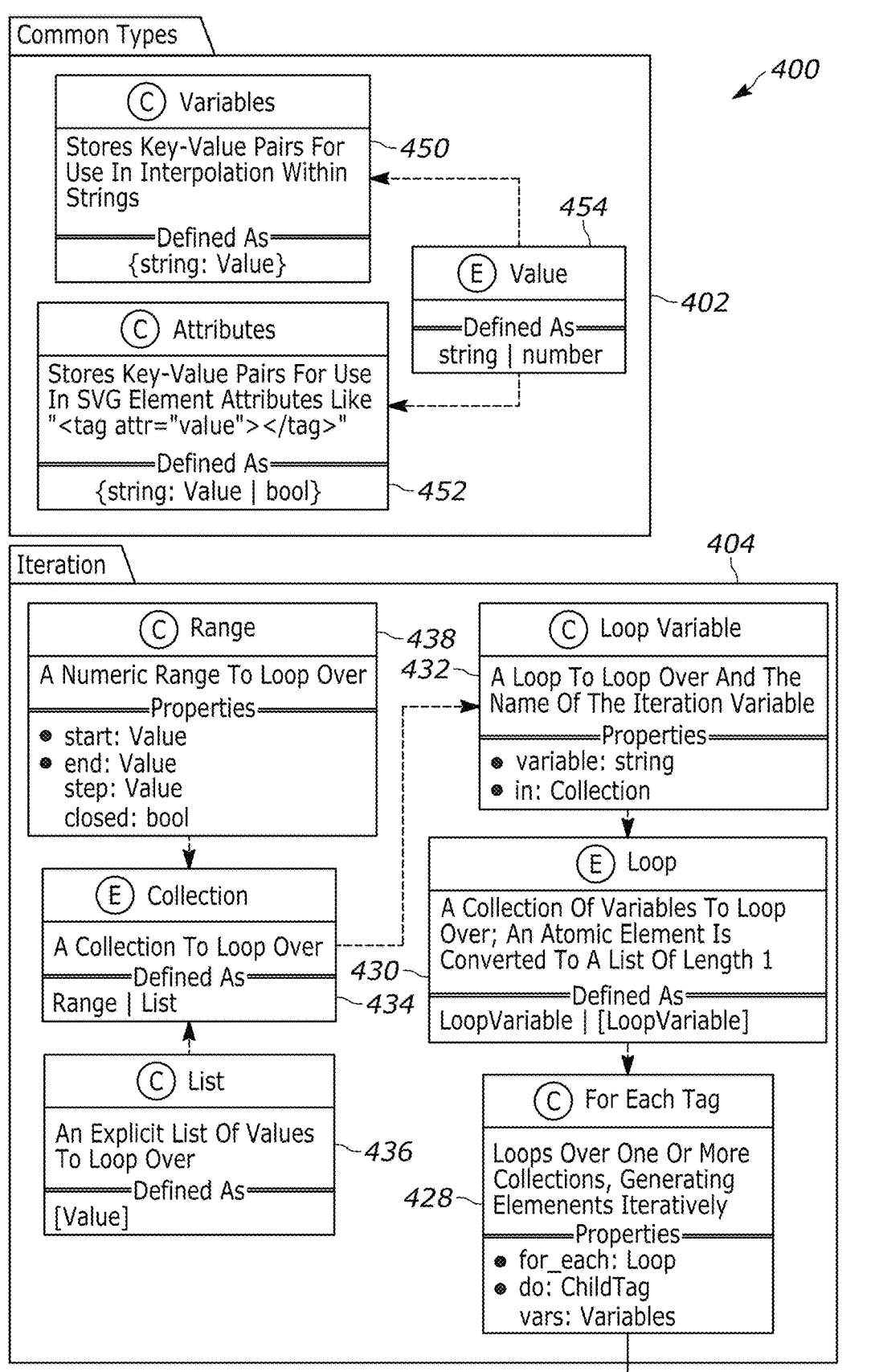
FIG. 4 comprises a schema that is used by the approaches described herein according to various embodiments of the present invention.
Figure 4:
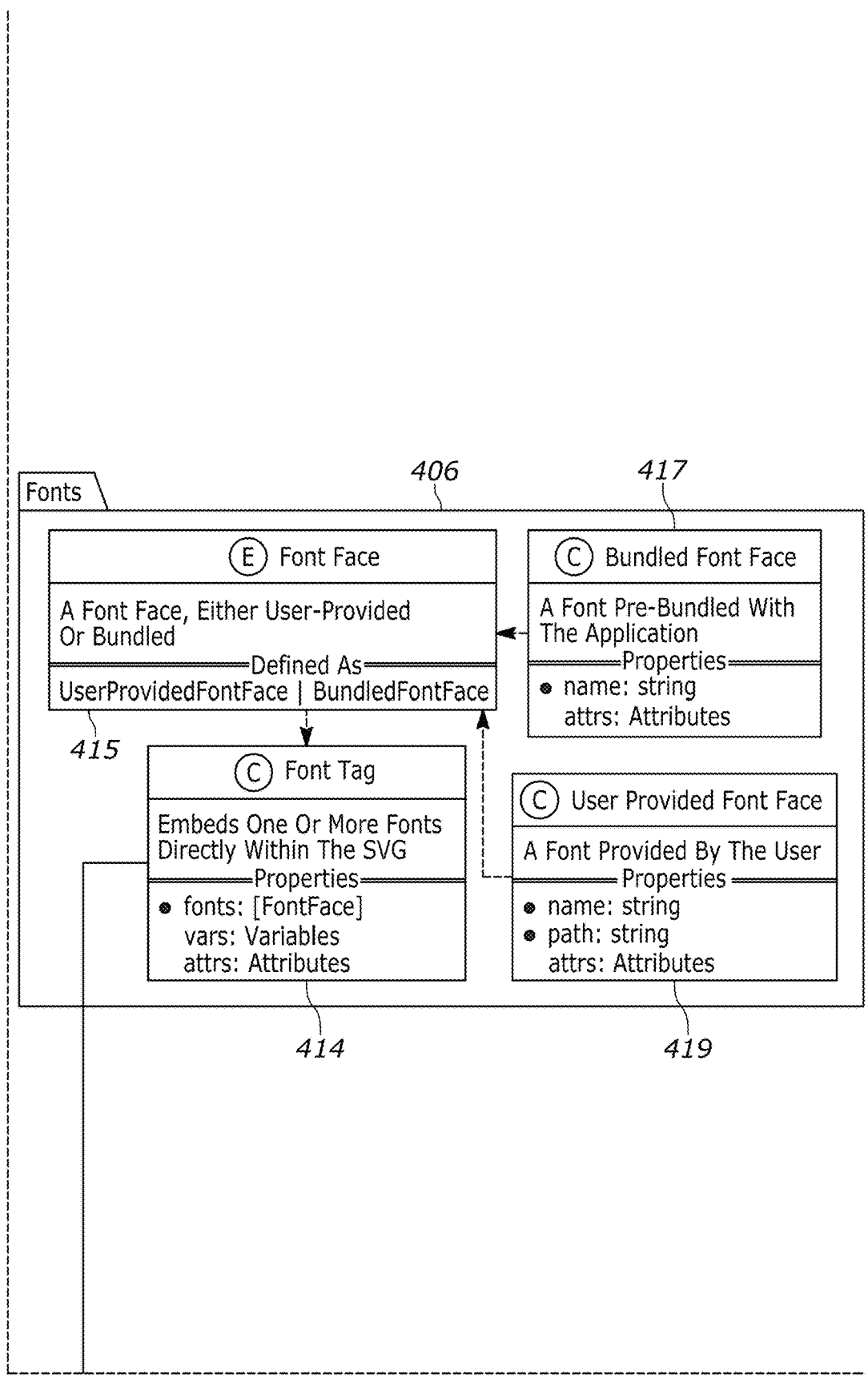
Figure 4:
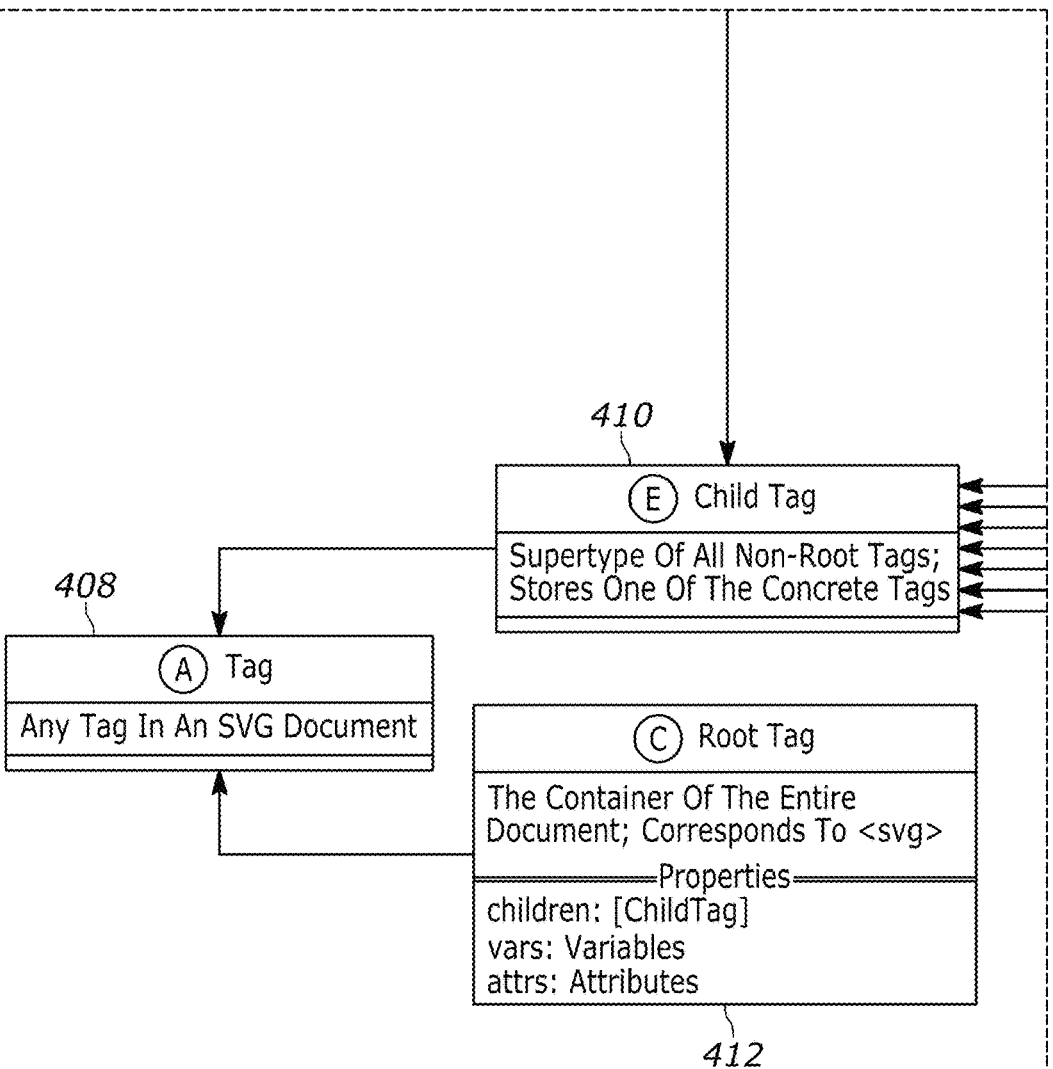
Figure 4:
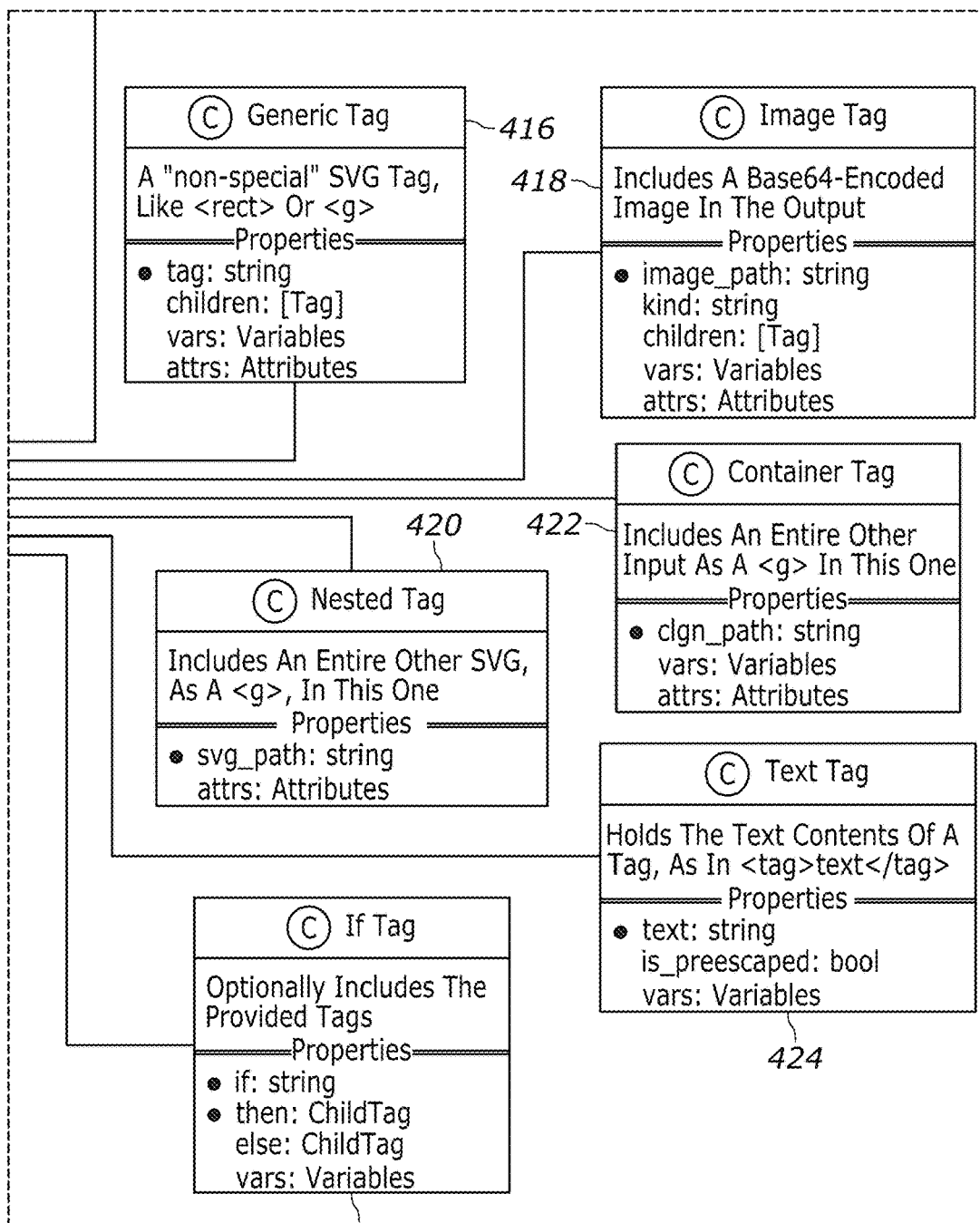

Referring now to FIG. 4, one example of a schema 400 is described. The schema defines the type of hierarchy used in one example of these approaches. The schema 400 is used during parsing operations to determine if an input file is formatted correctly and includes the correct types or type structure. For example, an examination of the type allows further deductions concerning the sub-types and sub-sub-types and so forth. The text file is read by the parser and evaluated according to the schema. The parser will look and see if the structure and contents of the text file are correct. If they are correct, then the file and objects representing the file are stored in an electronic memory. If not correct, then an error message is issued to the user. As a result, the memory will store a series of objects that have been verified as being correct. Once in memory, the main program can be executed. The memory objects are read and evaluated and converted in some aspects using LISP rules (rules of the LISP computer language) into an SVG-compliant file.

The manifest or input file utilizes a type hierarchy. Various terminology and conventions are used and these are described below.

For example: T| U means something is either of type T or U. [T] denotes a list whose elements are of type T. {K: V} means a dictionary with keys of type K and values of type V.

Various properties also are utilized. Within a type, name: V indicates that the type has a property named name of type V.

The schema 400 includes various tags and relationships between the tags. The tags define various types that can be present in an input file and constitute rules that can be utilized to determine whether instructions in the input file conform to the rules. For bullets (tags) in the diagram of FIG. 4, a property with a preceding bullet preceding is required. A property without a bullet is optional.

In the diagram of FIG. 4, arrows that are solid with a hollow arrowhead indicate that the origin node is an instance of the destination node. In the diagram, arrows that are dashed with filled arrowhead indicate that the destination node contains something of the origin node's type. These primarily serve to guide the viewer when looking at the nodes within one of the larger boxes.

The schema 400 is organized according to common types 402, iterations 404, and fonts 406.

A child tag 410 or a root tag 412 are instances of a tag 408. The root tag 412 can be thought of as the container for the entire document. The root tag 412 has properties of children (defined by the child tag 410), variables, and attributes.

The child tag 410 is a super tag of all non-root tags. The child tag 410 is a supertype. In these regards, a font tag 414, a generic tag 416, an image tag 418, a nested tag 420, a container tag 422, a text tag 424, and an if tag 426 are instances of the child tag 410.

The font tag 414 embeds one or more fonts into the SVG compliant file. Its properties include fonts (of type font face), variables, and attributes. The font tag 414 contains something of the type font face 415. Type font face 415 is either user provided font face 419 or bundled font face 417.

The bundled font face 417 is a font that is pre-bundled with the application or program. Its properties are a name (of type string) and attrs (of type attributes. The user provided font face 419 is a font provided by the user. The user provided font face 419 includes properties of a name (of type string), a path (of type string), and attrs (of type attributes).

The generic tag 416 is a non-special SVG tag. Its properties includes tags (of type string), children (of type tag), vars (of type variables), and attrs (of type attributes).

The image tag 418 includes a base 64 encoded image in the image. Its properties include image path (of type string), children (of type tag), vars (of type variables), and attrs (of type attributes).

The nested tag 420 includes an entire other SVG file. Its properties include svg_path (of type string) and attrs (of type attributes).

The container tag 422 includes an entire other input as a <g>. The properties of the container tag 422 include clgn-path (of type string), vars (of type variables), and attrs (of type attributes).

The text tag 424 holds the text contents of a tag as in <tag>text</tag>, which is how text is rendered within another element in the SVG format. The properties of the text tag 424 include text (of type string), is preescaped (of type Boolean), and vars (of type variables).

The if tag 426 optionally, based on a condition evaluated at runtime, includes the provided tag. The properties of the if tag 426 include "if" (of type string), "then" (of type child tag), "else" (of type Child tag) and vars (of type variables).

The for each tag 428 is an instance of the child tag 428. The for each tag loops over one or more collections and generates elements iteratively. The properties of the for each tag 428 include "for each" (of type loop), "do" (of type child tag), and vars (of type variables).

The for each tag 428 contains something of the loop tag 430. The loop tag 430 is a collection of variables to loop over. An atomic element is converted to a list of length 1 in some aspects. The loop tag 430 is defined as having one or more loop variables.

The loop tag 430 contains something of the loop variable tag 432. The loop variable tag 432 is a loop to loop over and the name of the iteration variable found in the loop tag 430. The properties of the loop variable tag 432 in variable (of type string), and "in" of type collection.

The loop variable tag 432 contains something of the collection tag 434. The collection tag 434 specifies a collection to loop over. The collection tag 434 includes a numeric range or a list.

The collection tag 434 contains some of the list tag 436. The list tag 434 is an explicit list of values to loop over. The list tag 436 is defined as values.

The collection tag 434 contains something the range tag 438. The range tag 438 is a range to loop over. The properties of the range tag 438 include "start" (a value), "end" (a value), "step" (a value), and "closed" (a Boolean value).

Common types 402 include a variable tag 450, an attributes tag 452, and a value tag 454. The variables tag 450 contains something of the value tag 454. The variables tag 450 stores key value pairs for use in interpolation within strings. The variables tag 450 is defined by a string of type value. The value tag 454 is defined as a string or a number.

The attributes tag 452 contains some of the value tag 454. The attributes tag 452 stores value pairs for use in the SVG element attributes such as "<tag attr="value"><tag>". The attributes tag 452 is defined as a dictionary with keys of type string and values of type Value or Boolean.

The present approaches parse the input or manifest file recursively and expect the top-level object to represent a RootTag. The RootTag's child elements, if any (and for the image to not be empty, there must be at least one child element), must be one of the subtypes of ChildTag as indicated in FIG. 4.

During decoding or parsing, the type of a given object is inferred from its set of properties. For instance, suppose that during parsing, the object currently being parsed is the following:

```
{
  "if": "{(>x 1)}",
  "then": {
    //truncated for brevity
  }
}
```

The presence of the properties "if", of type string, and "then", of type object, tells the parser that this must be an IfTag.

Similarly, if the object being parsed were the following:

```
{
  "for_each": {
    "variable": "i"
    "in": { "start": 0, "end": "{n_tiles_wide}" }
  },
  "do": {
    "for_each": {
      "variable": "j",
      "in": { "start": 0, "end": "{n_tiles_ tall}" }
    },
    "do": {
      "tag": "use",
      "attrs": {
        "href": "#tile"
        "x": " {(* i tile_width)} ",
        "x": " {(* j tile_height)}"
```

The presence of the keys ""for_each"", of type Loop (refer to the diagram for the definition of Loop) and do, of type object, indicates that this must be a ForEachTag.

Every object parsed must contain all of the required properties of exactly one of the subtypes of ChildTag as indicated in the diagram. If an object is encountered that does not conform to this specification-either an object without all of the required properties (of the correct types) for a single ChildTag, or an object with the properties of multiple ChildTags (so that decoding would be ambiguous), or an object whose properties are of the wrong type—execution is halted and an error returned to the user. An error is also returned if any unexpected (e.g., misspelled) properties are encountered.

As mentioned above, parsing of the input file is performed recursively. In the current example, the ""then"" property in the IfTag above would need to itself contain a valid ChildTag, as would the ""do"" property of the above ForEachTag.

The result of parsing is that all of the objects specified by the manifest file are materialized in memory, or, if an error is encountered, then the error is returned to the user and no output is produced by these approaches. Once the manifest or input file has been decoded or parsed into an in-memory representation, it can be written back to memory as an SVG-compliant file.

Figure 5A:
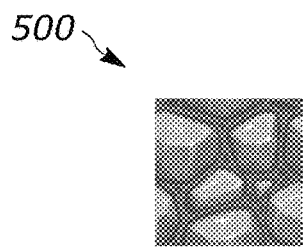
FIG. 5A and FIG. 5B comprises examples of images that are utilized by the approaches provided herein according to various embodiments of the present invention.
Figure 5B:
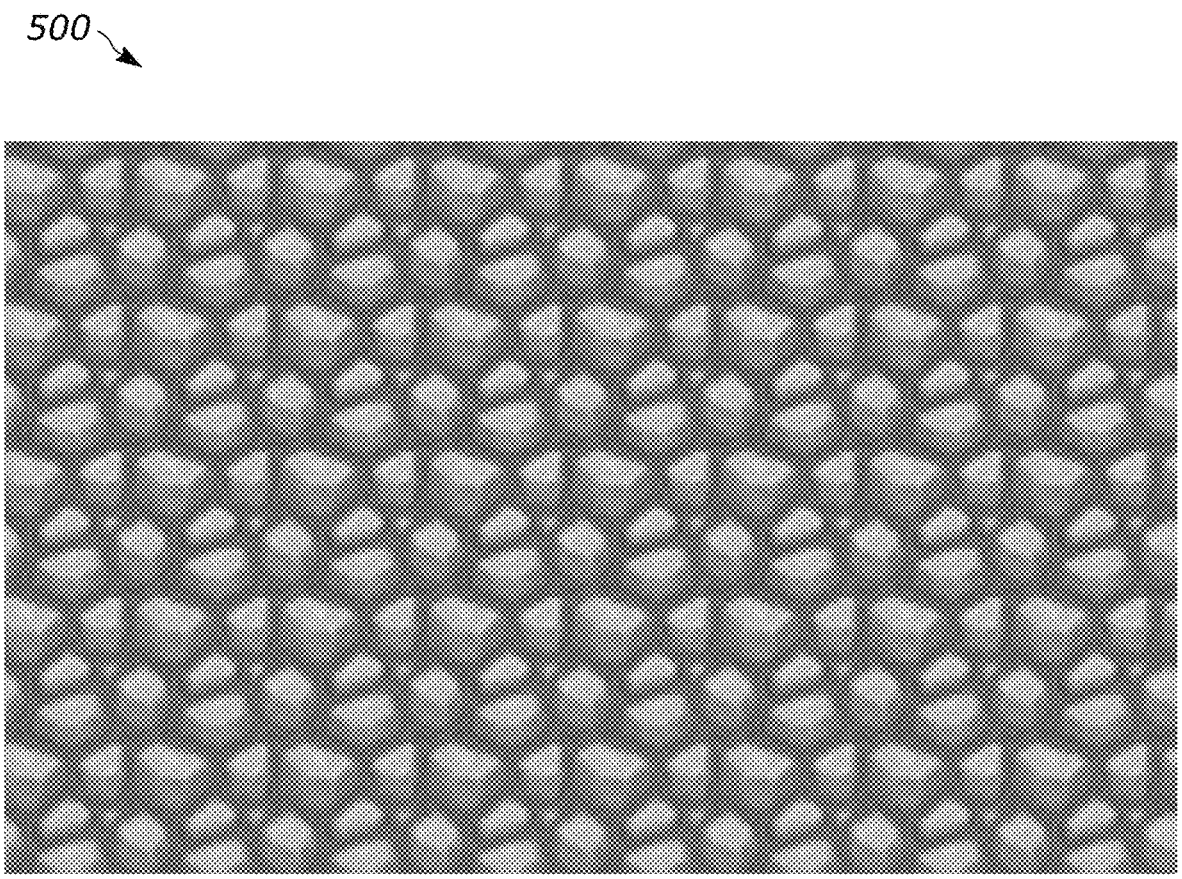

Referring now to FIG. 5A and FIG. 5B, one example of an image 500 to produce is described. As shown, the image is of a rock. FIG. 5A shows the image of a stone that is desired to be tiled horizontally and vertically to create a larger background.

In FIG. 5B, it can be seen that the image 500 of FIG. 5A has been copied horizontally and vertically to achieve a tiling that is 8 images wide and 5 images wide thereby creating a larger background image.

Referring now to FIG. 6, one example of an input or manifest file (in a JSON file format) that describes the image of FIG. 5B is provided. As described elsewhere herein, one purpose of using plain text for the input or manifest file is to allow the user to precisely specify how the image will be created.

The program of FIG. 6 uses the ForEachTag, which has the ""for each"" and ""do"" properties. The former property specifies a set of collections to iterate over and the name of the iteration variable, while the latter holds a template that is instantiated once per loop iteration. These are useful for doing repeated work that would be tedious to do by hand such as creating the background image of FIG. 5B.

The code shown in FIG. 6 tiles the image of FIG. 5A horizontally and vertically to create a larger image. More specifically, nested ForEachTags are used to achieve a tiling 8 wide and 5 high.

The present approaches allow the user to use variables and functions in the input or manifest file. The present approaches interpolate the expressions encountered in strings by replacing them with their computed value. More specifically, when these approaches see text of the form {var_name}, this expression is replaced with the value of var_name as specified in the ""var"" property of this tag or any parent tag. When the program sees text of the form {(expression)}, it evaluates the expression as in, for example, LISP, again substituting variables. For instance, if variable x has the value 2 and y has the value 3, then the string ""x is {x}; y is {y}; x+y={(+x y)}"" would be replaced with the string ""x is 2; y is 3; x+y=""—the values within the { } are evaluated and substituted.

These approaches support a large number of commonly used functions, including but not limited to: logical functions such as not, and, or, and if-else; numeric constants such as e and x; arithmetic operations such as +, −, *, /, and pow; trigonometric functions such as sin, cos, and tan; other commonly used math functions such as exp, log, floor, ceil, abs; functions on collections such as len and is-empty; and functions for operating on text, such as uppercase, lowercase, and trim.

All expressions are expressed in LISP syntax, such as {(+(* a b) (/ c d) (log x) (exp y))}, which would correspond to (a·b)+(c/d)+log(x)+exp(y). Expressions can be nested.

One advantage of the present approaches is they are used to automate some of the more complex work a user might want to do. To that end, most tags have some special behavior associated with them. These tags are an interface exposed by the program to make it easier for the user to generate images.

For instance, an ImageTag has an "image path" property that specifies the path to the image to be embedded in the output SVG-compliant file. When converting an ImageTag to SVG, these approaches in some aspects read in the image at that path, encode it into a base64 format, and then embed it in the resulting SVG-compliant file. This process is something a user could do by hand, but the manual process is typically onerous. Consequently, the present automated approaches are much more convenient to use than previous manual approaches.

Similarly, the ContainerTag allows including an entire other input folder through its "clgn_path" property. That folder is treated like an image unto itself, and is rendered as its own SVG before being included in the current one. This is another task, that could be performed by hand, would once again be onerous and the present automated approaches alleviate these problems.

The present approaches allow use of the ForEachTag, which has the "for_each" and "do" properties. The former property specifies a set of collections to iterate over and the name of the iteration variable, while the latter holds a template that is instantiated once per loop iteration. These are useful for doing repeated work that would be tedious to do manually and the automated nature of the present approaches alleviate these problems.

FIG. 7 shows the resultant SVG-compliant file 700 (which has had a portion of it truncated for brevity) created by these approaches using the input or manifest file of FIG. 6. The SVG-compliant file includes various commands that have been converted from the objects from the input file of FIG. 6.

With the input or manifest file parsed into objects and the objects loaded into memory (e.g., as strongly typed objects), the next step is to write this object representation as an SVG-compliant file. At a high level, this process can be considered the reverse of reading and parsing the input or manifest file. In other words, the in-memory representation is converted back into plain text, but this time into an SVG-compliant format instead of the original text format (e.g., a JSON format). These approaches specially handle most of the tags, applying logic to convert them into the SVG-compliant file.

It can be seen that the image file stone.webp (describing the stone in FIG. 5A and referenced in the input file) is now embedded in the resulting SVG-compliant file. This means that SVG-compliant file can be viewed on any device, not just the device that created it. Also, while the image that's been tiled in this example is approximately 3 KB in size, the resulting SVG-compliant file is not 40 times that size (120 KB), as it would be in an image editing program that relied on copy-and-paste to create multiple copies of an image, but merely 6 KB. Size savings like this are another benefit provided by these approaches.

Figure 8:
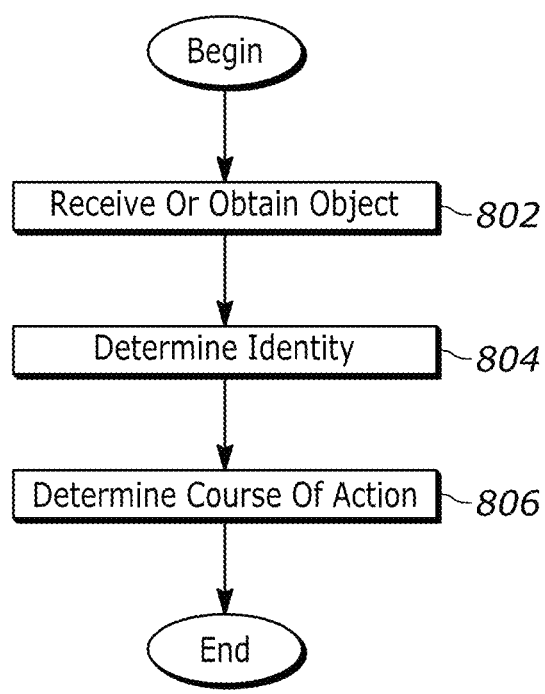
FIG. 8 comprises a conversion program flowchart according to various embodiments of the present invention.

Referring now to FIG. 8, one example of an approach that converts the in-memory representation (objects that have been parsed obtained from the input or manifest file) is described. At a high level, this approach examines the objects and decides and converts these into an SVG-compliant program file.

At step 802, an object is received or obtained from memory. The object may, in one example, use a "for-each" object that is defined by the schema that has been described with respect to FIG. 4. In this example, an outer "for-each" loop includes an inner "for-each" loop.

At step 804, the identity of the object is determined. For example, the identity of an object (e.g., a "for-do" object) is determined.

At step 806 and based on the determined identity, the program decides what to do with the identified object (e.g., render what is in the "for-do" loop in this example). Various programming structures and approaches can be utilized to determine what to do with the identified objects. For example, a mapping or mapping-type table may be used where once an object is identified, programmatic actions are performed based upon the type of object that has been identified. The exact programmatic actions perform depend upon the type of object and map that object type into SVG-compliant code or instructions that are inserted into the SVG-compliant output file. It will be appreciated that this is one example of a conversion process and that other examples are possible.

In this example, the SVG-compliant file creation algorithm renders what is inside the outer "for-do" loop and this is another "for-do" loop. At the first pass, the i value is 1 but the inner loop has j=1, 2, 3, 4, and 5. So the first 5 rows are produced in the SVG-compliant file. Then, i=2, and j=1, 2, 3, 4, and 5 again rendering another 5 rows. This process continues to produce the other rows of the SVG-compliant output file.

Figure 9:
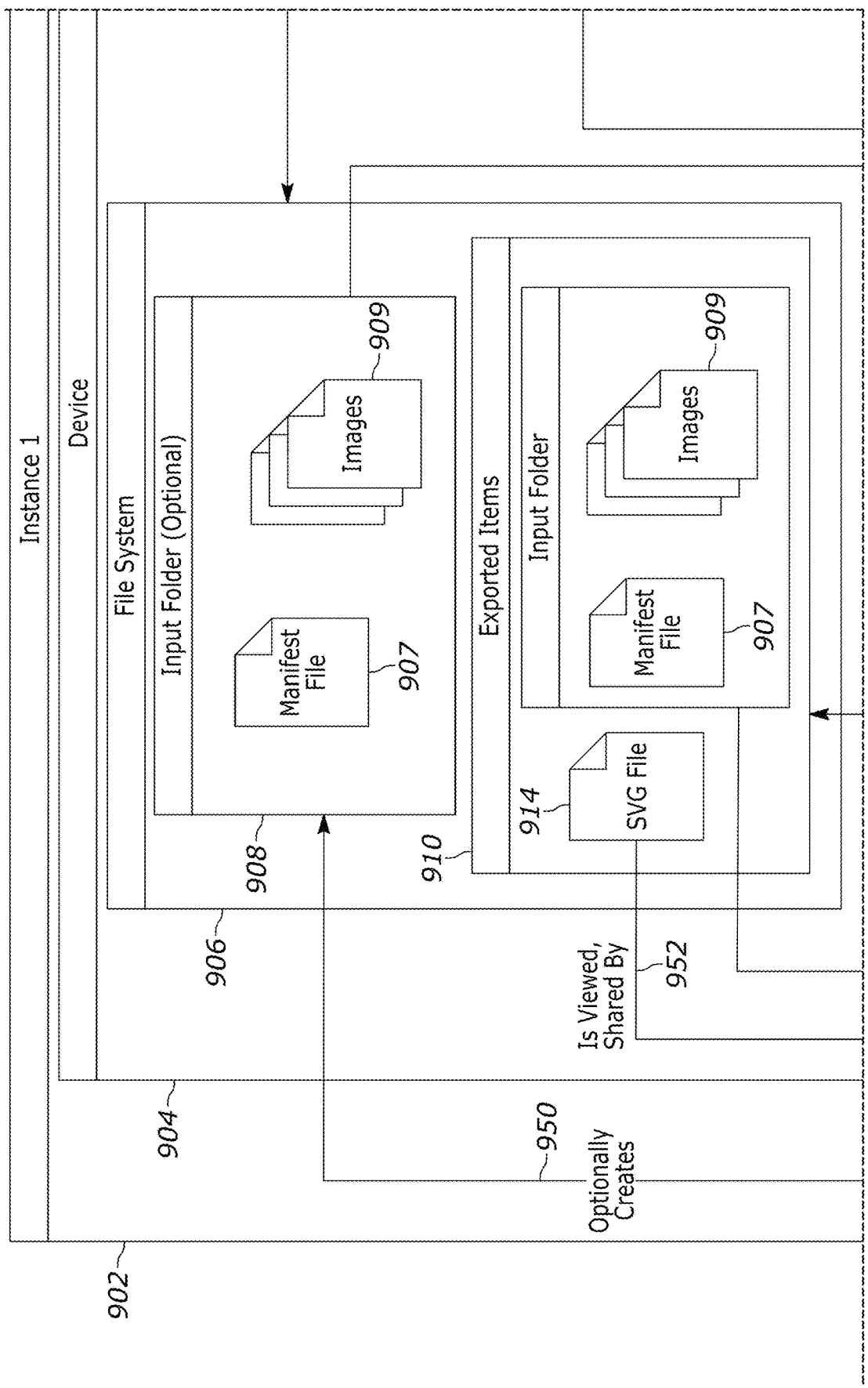
FIG. 9 comprises a diagram of a system including a GUI according to various embodiments of the present invention.
Figure 9:
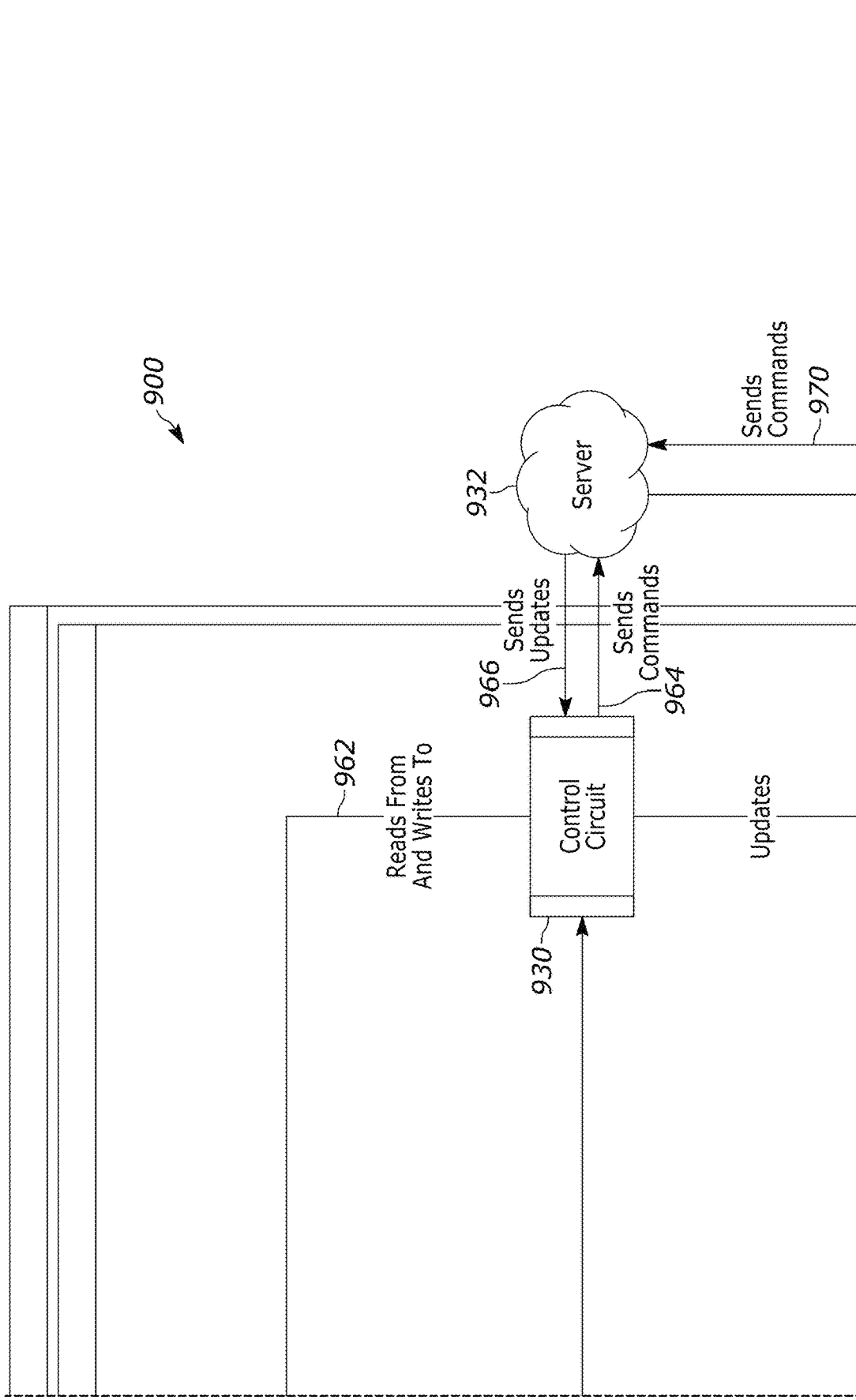
Figure 9:
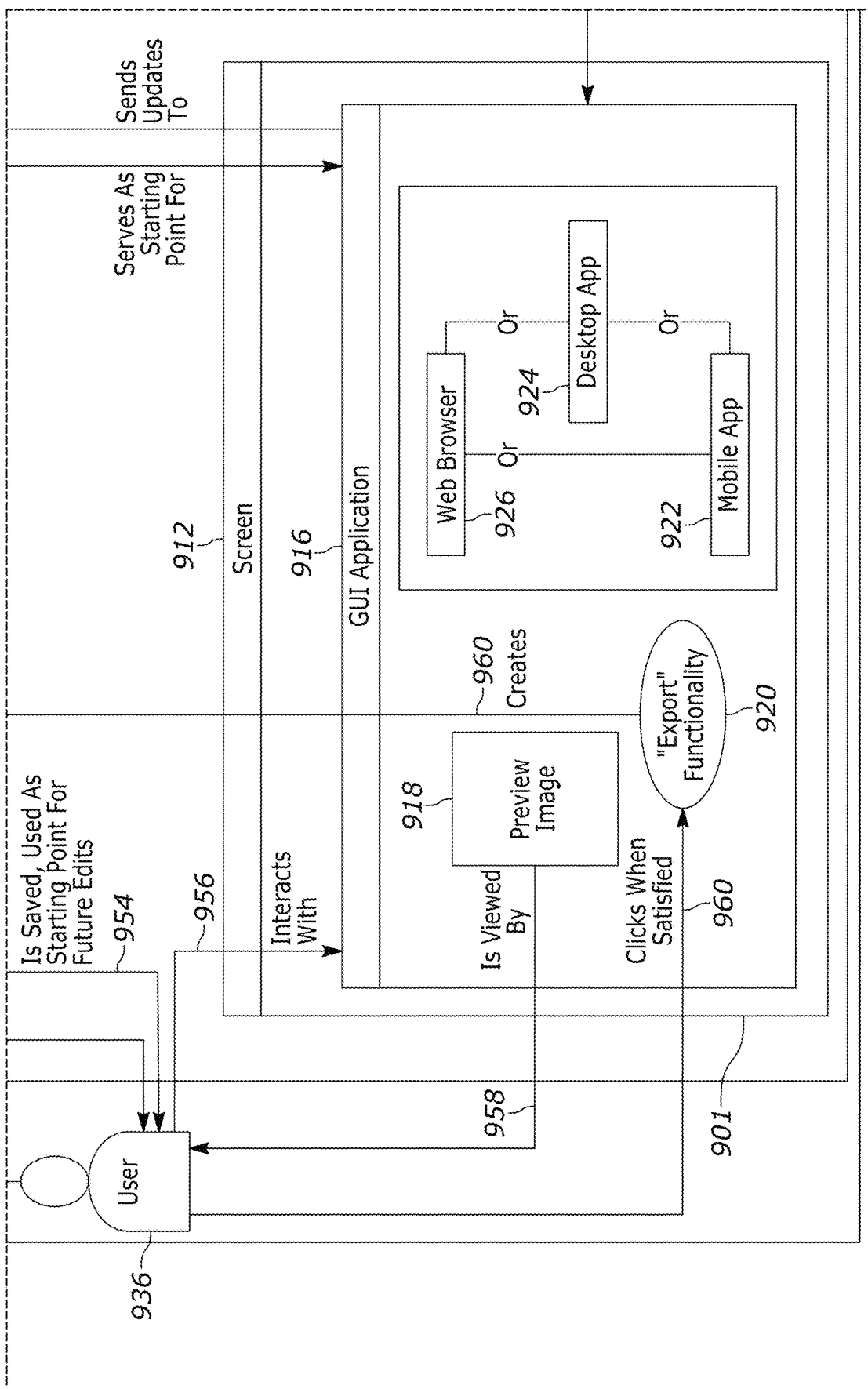
Figure 9:
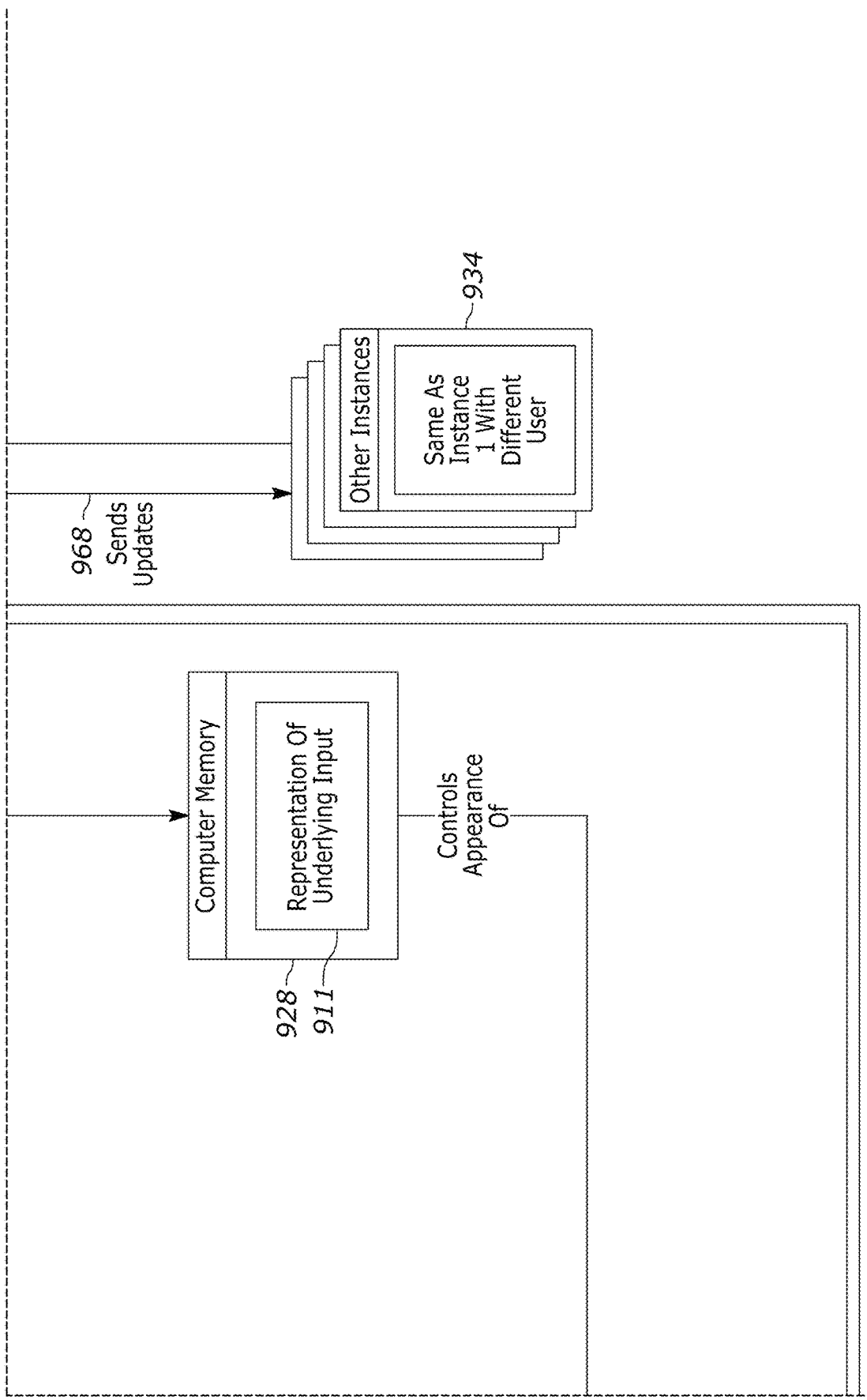

Referring now to FIG. 9, one example of a system 900 that includes a graphical user interface (GUI) 901 is described. It will be appreciated that in one option the GUI 901 is not used. In this example, these approaches are run as a command-line application on a computer by which the user interacts with through a text-based terminal, shell, or similar application. When these approaches are executed in this way, the user enters the path to the input folder and a program (e.g., as described with respect to FIG. 8) produces the corresponding output SVG-compliant file. In aspects, the command lines could be the following (e.g., shown in bash shell syntax):

clon - -in-folder /path/to/input/folder - -out-file/path/to/output.svg

In this mode of operation, no feedback is provided to the user other than "success, SVG produced" or "error encountered". Upon inspecting the resulting SVG-compliant file, should the user wish to make any changes, the user edits the appropriate files in their input folder and re-runs the program that creates the SVG-compliant file.

When using a graphical user interface, the user interacts with the GUI 901 that provides various tools, such as the ability to add, remove, and alter the style and/or appearance of shapes, text, and images. The user would interact with these tools through standard computer input devices such as a keyboard, mouse, voice control software, etc. A live preview of the resulting SVG-compliant file can be displayed to the user in response to their actions. The GUI 901 would provide instant feedback to the user; there would be no need to re-run any program (e.g., the SVG-compliant file creation program), as each change the user made to the image would be reflected back to them immediately.

The GUI 901 is backed by a standard input folder, containing the manifest or image file and any images the user wanted to include. Each time the user edits their image, the GUI 901 would perform two tasks at once: it would update both the visual representation of the image (as displayed on the user's screen in the preview area), and the data used to construct the image (the input folder, residing in computer memory), in tandem and, in aspects, simultaneously. Once the user is satisfied with the image they created, they will have not only an image (in SVG-compliant format) that they can view and share with other users, but with no extra effort they will have also created the input folder that is used to create the SVG-compliant file. This input folder can also be exported from the GUI 901, effectively saving the user's image in the form of the manifest or input file and assets necessary to recreate it. The user would also be free to edit the contents of this input folder (e.g., replacing some images in the folder with other images) without the GUI 901, should they choose.

At some point in the future, the user could then re-import this input folder into the GUI 901 to continue editing the image, or share the folder with others so that they could edit the image. While image editors that allow the user to export an image exist, that image generally cannot be re-imported back into the image editor so that the user can pick up editing right where they left off. Indeed, images generally do not contain enough information for this to even be possible. For instance, after drawing some shape on a JPEG image, the results would normally be in the form of another JPEG with the shape "baked in", i.e., no longer separable from the rest of the image. The ability to provide the user with the files necessary to reimport their image and pick up where they left off with no loss of data is advantageous. In other words, every part of the re-imported image is just as editable as it was when the user first worked on it.

Another aspect of the GUI-based application is that it would enable collaborative editing of images. Whereas in single-user mode, the GUI would translate a user's actions into updates to the user's private image and underlying input folder, in collaborative mode the actions of several users would instead be translated into updates made to a shared copy, or multiple shared copies, of the input folder. Each action a user took to edit an image would not only edit their local copy of the preview image and the underlying input folder, but would also edit the shared copy or copies of those as well. Those changes would then be propagated to other users collaborating on the same image. Further discussion regarding collaboration is discussed below with respect to FIG. 10.

Referring now specifically to the elements of FIG. 9, the system 900 includes an instance 902 that is a specific occurrence of a device 904. The device 904 includes a file system 906, a control circuit 930, a computer memory 928 and a screen 912.

The file system 906 includes an input folder 908 (with a manifest or input file 907 and images 909). The file system 906 also includes exported items 910 including an SVG-compliant file 914, the input folder 908 (with the manifest or input file 907 and the images 909).

The screen 912 includes the GUI 901. The GUI 901 includes a preview image 918, export functionality 920. The GUI 901 also includes a web browser 926, a desktop application 924, or a mobile application 922. The GUI 901 is executed by the control circuit 930.

The control circuit 930 is electronically coupled to a server 932. The server 932 is coupled to other instances 934 of devices being operated by other users. In aspects, the other instances 934 have the same architecture, form, and/or format as the instance 902, but are associated with different users.

The memory 928 includes representations of underlying objects 911. The underlying objects 911 are the objects that are formed when the manifest or input file 907 is parsed and examples of this process have been described elsewhere herein.

A user 936 performs various steps or actions with the device 904. When the user 936 begins using the system, they can either start with an existing input or manifest file, or upload an existing input folder to initialize the application with an image of their choice. In these regards, the user 936 can re-import the input folder 908 with no loss of data as has been described above.

In these regards and at step 950, the user optionally creates the input folder 908 including its contents. Step 950 assumes the input folder 908 does not previously exist. Creating the contents of the input folder 908 may include creating or obtaining the manifest or input file 907 and/or the images 909. The manifest or input file 907 may be, in examples, be a JSON file and the user 936 may use any appropriate computer program to create this file. The images 909 may be any type of images in any type of format such as JPEG images to give one example. Alternatively, items in the input folder 908 may be imported or re-imported.

At step 952, the user 936 can optionally view the SVG-compliant file 914 that is created by the process. In aspects, the SVG-compliant file 914 may be viewable on the screen 912. The SVG-compliant file 914 may be created as has been described elsewhere herein by the control circuit 930.

At step 954, the user 936 saves the input folder 908 including its contents. This can be used as a starting point for further edits in the future. The user 936 may save the input folder 908 when they have finalized the content of the folder 908 or when they wish to come back to editing the contents of the folder 908. The input folder 908 may be saved in the computer memory 928 or some other memory storage device.

At step 956, the user 936 interacts with the GUI 901. Various interactions are possible such as previewing the image and, once the user 936 is satisfied with the image, indicating to the export functionality 920 that the input folder 908 is ready to be exported to the other instances 934. The indication to cause the export functionality 920 to export the folder 908 may be made by the user by, for example, clicking on a mouse or entering some command. The export functionality 920 may be executed by the control circuit 930.

At step 958, the user 936 views the preview image 918. The preview image 918 may be the image defined by the input or manifest file 907 as the input or manifest file 907 currently defines the image. In other words, the SVG-compliant file 914 has not been finalized and the user can view the current state of the image in real time as the preview image 918. In these regards, the control circuit 930 may obtain the manifest file 907 along with the images 908, convert the image to graphical elements to create the preview image 918.

At step 960, the user 936 clicks the screen (or otherwise indicates by some other action) when they are satisfied with the preview image 918. This causes the export functionality 920 to create the exported items 910 at step 960. The export functionality 920 may be a separate computer program or instructions that are executed by the control circuit 930 that causes the exported items 910 to be created.

The control circuit 930 reads and writes information to the file system 906 at step 962. The information that is read may include the exported items 910, for example, the SVG-compliant file 914, the manifest or input file 907, and the images 909. When the control circuit 930 receives updates from the server 932, the control circuit 930 may directly alter the contents of the folder 908 including the manifest or input file 907 and the images 909.

The control circuit 930 sends commands to the server 932 at step 964. The control circuit 930 also receives updates made to the SVG-compliant file 914 from other users (operating at the other instances 934) via the server 932 at step 966. The commands indicate changes made to the SVG-compliant file 907 and/or the images 909. The commands may also include the initial version of the SVG-compliant file 907 and/or the images 909.

The server 932 sends updates to the other instances 934 at step 968. The server 932 also receives commands from the other instances 934 at step 970.

In aspects, users at different instances (at different devices) change or collaborate with the creation of an image. The changes made by the user are communicated to the server 932 via commands. The server 932 receives and analyzes the commands and then sends updates to the other users at the other instances where the updates indicate the changes made by the other users. Updates may be sent immediately or batched at different times. In this way, the image for which collaboration is occurring is kept up to date for all users.

Figure 10:
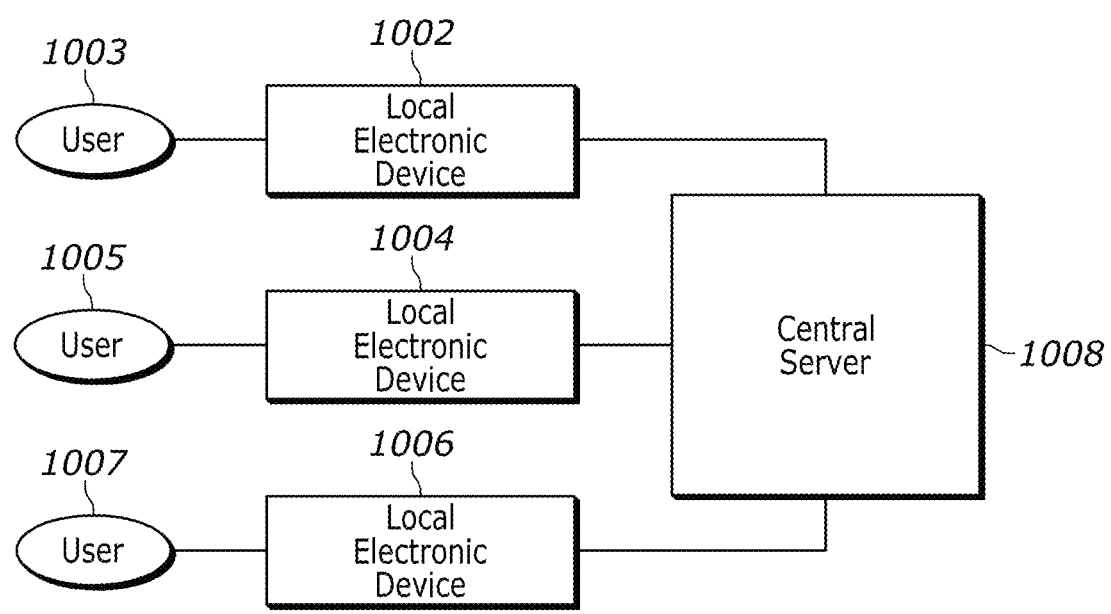
FIG. 10 comprises a diagram of a system that provides for collaboration in the creation and editing of images according to various embodiments of the present invention.

Referring now to FIG. 10, one example of sharing and collaboration approaches for image creation is described. When the user begins using the application, they can either start with an existing input or manifest file, or upload an existing input folder to initialize the application with an image of their choice. The user then controls the applications, and each action they take results in a live preview image (displayed on a GUI) being updated. In response to this live preview image, the user can continue to edit the image or export their work. When the user is satisfied with their work, they can export their work, both as an SVG-compliant file and as an entire input folder containing the manifest file and all images/attachments.

Users can collaborate on images by all running a separate copy of the application programs that modify the JSON input file and create the SVG-compliant file. Generally speaking, a central server receives the sequence of actions from all users' applications and distributes these actions to all other users' applications, which would then update their local copy of the image accordingly. In this way, users' images would be kept in synchronization (with the images being edited by all other users) as they edited them.

The system includes local electronic devices (e.g., computers, servers, or other types such as electronic devices including smart phones, tablets or laptops) 1002, 1004, 1006, users 1003, 1005, 1007 operating these servers or computers, and a central server 1008. Interconnections between these elements may be provided by various electronic networks or across a single network.

Each local electronic device 1002, 1004, and 1006 may include a processor (or other electronic controller device) and an electronic memory. The electronic memory may store the programs or applications described herein, i.e., the programs or applications that create an input or manifest file, convert the input file into in-memory objects, and convert the in-memory objects into an SVG-compliant file). The programs also include the GUI that allows the user to preview the image they are creating in real-time and otherwise interact with the images. The central server 1008 may also include a processor and memory and may be disposed at a central location so as to be accessible from the local electronic devices 1002, 1004 and 1006.

Sharing and collaboration can be accomplished by using the central server 1008 that is used as a central clearing house. A user creates an export package (SVG-compliant file, a manifest or input file, e.g., a JSON file, and images, e.g., in JPEG format), which is sent to the central server 1008 from the local electronic device 1002, 1004, or 1006. Other users become are one or more collaborators and make changes to the image through modifications to the input file and/or the SVG-compliant file.

A program or software at the local electronic device 1002, 1004, 1006 detects a change was made by one of the users 1003, 1005, or 1007, and sends the change and/or the indication of the change to the central server 1008, which sends an update to the other local electronic devices 1002, 1004, or 1006. The central server 1008 receives commands from a user 1003, 1005, 1007 showing the changes made to the image, and sends an update indicating the changes to be made to the other users 1003, 1005, 1007. The program (or controller) at the local electronic device 1002, 1004, or 1006 receives the update, automatically changes the manifest or input file, re-runs the program to create the SVG-compliant file, and then renders the SVG-compliant file.

For example, the user 1003 at the local electronic device 1002 creates an 8 by 5 (dimensions) tiled file (as specified by a JSON input or manifest file, an SVG-compliant file, and any images used by the input file or SVG-compliant file). This information is sent from the local electronic device 1002 to the central server 1008 in the form of an electronic command. The input file, SVG-compliant file, and any images may be sent to the users 1005 or 1007 as an initial update. The users 1005 and 1007 previously had requested to collaborate and this request was sent to the central server 1008. As a result, the central server 1008 knows which local electronic devices updates are to be sent.

User 1005 at the local electronic device 1004 changes the dimensions of the tile file to 8 by 20 at the local electronic device 1004. In other words, user 1005 changes the SVG-compliant file and/or a JSON input or manifest file so that the resultant image has dimensions that are different than the original dimensions originally sent by the user 1003. As a result of the user 1005 changing the dimensions, an electronic command is sent from the local electronic device 1004 to the central server 1008. The command indicates that the user 1005 at the local electronic device 1004 changed the tiled image to 8 by 20. The central server 1008 receives the commands and informs the users 1003 and 1007 of the updated image and what was done to the image by the user 1005. The updates can occur either periodically or immediately to the users 1003 and 1007. The programs running on the local electronic devices 1002 and 1004 make the changes automatically to their local version of the manifest or input file and their local version of the SVG-compliant file. Once one, some, or all users agree, the SVG-compliant file can be used to perform various tasks as has been described elsewhere herein.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. A system, the system comprising:
 a computer memory configured to store an input file, a graphical user interface, and a browser;
 a control circuit, the control circuit being coupled to the computer memory, the control circuit configured to operate and control the graphical user interface and execute the browser;

wherein the graphical user interface is configured to render a display on a display screen, the display comprising a first area that includes a preview image described by contents of the input file as rendered by the control circuit, wherein the preview image rendered in the first area of the display is automatically and responsively changed in real time by the control circuit as the contents of the input file are changed;

wherein a user adjusts the contents of the input file via interactions with the browser until a user is satisfied with the preview image;

when the user is satisfied with the preview image, the input file is automatically and without human interaction converted by the control circuit into a single output scalable vector graphic (SVG) compliant file and stored in the computer memory and wherein the SVG compliant file includes both vector graphics and images;

wherein the control circuit determines an action to take with the single output SVG compliant file, the action being one or more of:

displaying contents of the single output SVG compliant file on the display screen;

transmitting the single output SVG compliant file to an electronic device of another user for display;

reading the contents of the single output file, determining command tags of portions of the single output SVG compliant file, and selectively displaying the portions on the display screen based upon the command tags; and utilizing the single output SVG compliant file to create electronic control signals that are effective to selectively control a machine.

2. The system of claim 1, wherein the control circuit is coupled to an electronic network and the control circuit monitors the electronic network for commands or messages sent by external computer programs intended to modify the input file, and, when received, analyzes the commands or messages, and automatically changes contents of the input file according to contents of the commands or messages, allowing collaboration between multiple users utilizing multiple computer programs to occur.

3. The system of claim 1, wherein the browser selects only some portions of the single output file to display.

4. The system of claim 3, wherein the some portions are selected based upon a user selection.

5. The system of claim 1, wherein the input file is configured in JSON or another plain-text format.

6. The system of claim 1, wherein the display screen is located on a smartphone, laptop, or personal computer.

7. The system of claim 1, wherein the machine is one or more of an industrial machine, a computer, or a user electronic device.

8. The system of claim 1, wherein utilizing the single output SVG compliant file to create electronic control signals comprises applying the single output SVG compliant file to electronic circuitry or a neural network to produce the electronic control signals.

9. A method, the method comprising:

storing an input file, a graphical user interface, and a browser in a computer memory;

providing a control circuit, the control circuit configured to operate and control the graphical user interface and execute the browser;

wherein the graphical user interface is configured to render a display on a display screen, the display comprising a first area that includes a preview image described by contents of the input file as rendered by the control circuit, wherein the preview image rendered in the first area of the display is automatically and responsively changed in real time by the control circuit as the contents of the input file are changed;

adjusting the contents of the input file via interactions with the browser until a user is satisfied with the preview image;

when the user is satisfied with the preview image, by the control circuit automatically and without human interaction converting the input file by the control circuit into a single output scalable vector graphic (SVG) compliant file and storing the single output SVG compliant in the computer memory and wherein the SVG compliant file includes both vector graphics and images;

by the control circuit, determining an action to take with the single output SVG compliant file, the action being one or more of:

by the control circuit, displaying contents of the single output SVG compliant file on the display screen;

by the control circuit, transmitting the single output SVG compliant file to an electronic device of another user for display;

by the control circuit, reading the contents of the single output SVG compliant file, determining command tags of portions of the single output file, selectively displaying the portions on the display screen based upon the command tags; and by the control circuit, utilizing the single output SVG compliant file to create electronic control signals that are effective to selectively control a machine.

10. The method of claim 9, wherein the control circuit is coupled to an electronic network and the control circuit monitors the electronic network for commands or messages sent by external computer programs intended to modify the input file, and, when received, analyzes the commands or messages, and automatically changes contents of the input file according to contents of the commands or messages, allowing collaboration between multiple users utilizing multiple computer programs to occur.

11. The method of claim 9, wherein the browser selects only some portions of the single output file to display.

12. The method of claim 11, wherein the some portions are selected based upon a user selection.

13. The method of claim 9, wherein the input file is configured in JSON or another plain-text format.

14. The method of claim 9, wherein the display screen is located on a smartphone, laptop, or personal computer.

15. The method of claim 9, wherein the machine is one or more of an industrial machine, a computer, or a user electronic device.

16. The method of claim 9, wherein utilizing the single output SVG compliant file to create electronic control signals comprises applying the single output SVG compliant file to electronic circuitry or a neural network to produce the electronic control signals.

\* \* \* \* \*